C. J. RENZ.
Process for Preserving Fruit.

No. 230,573. Patented July 27, 1880.

WITNESSES:
W. W. Hollingsworth
Edw. W. Byrn

INVENTOR:
C. J. Renz
BY
ATTORNEYS.

N. PETERS, PHOTO-LITHOGRAPHER, WASHINGTON, D. C.

UNITED STATES PATENT OFFICE.

CARL J. RENZ, OF HUDSON, NEW YORK.

PROCESS FOR PRESERVING FRUIT.

SPECIFICATION forming part of Letters Patent No. 230,573, dated July 27, 1880.

Application filed July 11, 1879.

*To all whom it may concern:*

Be it known that I, CARL J. RENZ, of Hudson, in the county of Columbia and State of New York, have invented a new and Improved Process for Preserving Fruit; and I do hereby declare that the following is a full, clear, and exact description of the same, reference being had to the accompanying drawings, forming part of this specification, in which—

Figure 1:
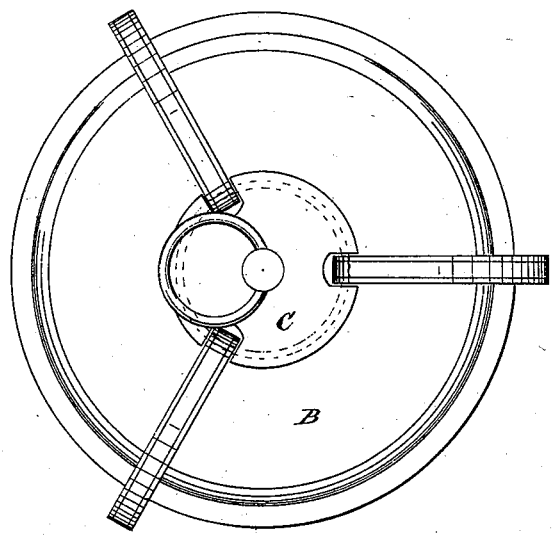
Figure 2:
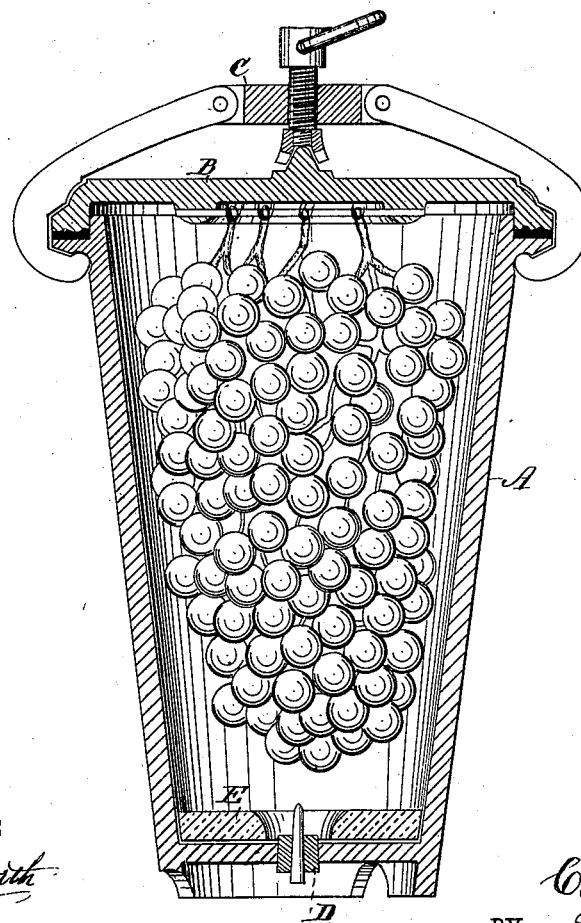

Figure 1 is a plan, and Fig. 2 a sectional, view of an apparatus adapted to carry out my my process.

My invention consists in a process of preserving fruits, and more particularly grapes, pears, strawberries, and other fresh whole fruits without the use of a mother liquor.

It is an improvement in that general process of preserving in which the air is first exhausted from the receptacle in which the fruit is placed, and in which the gases subsequently evolved by the fruit are taken up by an absorbent.

The improvement consists in deodorizing and absorbing the said condensable gases by a block of quassia wood or other material impregnated with quassia, as hereinafter described.

The invention also consists in the application of the peculiar absorbent, as hereinafter described.

In carrying out my invention the rarefaction of the air is accomplished by heating the vessel or apparatus to 140° Fahrenheit, more or less. The degrees of heat can be ascertained by suspending a thermometer for several minutes in the vessel while it is heated. If several vessels are heated at the same time, it will suffice to ascertain the degrees of heat only in one. The thermometer must not touch the bottom nor the wall of the vessel.

The rarefaction of air can also be accomplished by using an air-pump; but heat seems to me preferable, because it is the cheapest method, needs less skill, and has a very refreshing effect on the fruit, and, as the fruit has ripened in the hot summer sun, it is naturally accustomed to heat.

Any suitable form of apparatus may be employed for carrying out my process. I have shown in the drawings, however, one well adapted to this purpose, in which A is a receptacle in which the grapes are suspended. B is a removable cover, held on with an airtight connection by a clamping-frame, C. D is a removable plug at the bottom, and E is the absorbent ring or disk.

The absorption of moisture and gases is effected by means of a ring, disk, or block of quassia wood, or by clay prepared with water in which a quantity of quassia was soaked. The clay, after having been wetted with this water, must be well dried, but has to remain otherwise in its raw condition—must not be burned like pottery.

Quassia (*quassia excelsa*) is a wood chiefly obtained from Jamaica and the Carribean Islands, where it is called "Bitter ash." It is inodorous, and has a purely bitter taste, surpassed by that of few other substances in intensity and permanence. It imparts its active properties with its bitterness very freely to water.

I find that the intense bitterness of the quassia imparted to clay by means of the water in which it was soaked improves the absorbing properties of the clay and makes it quite a powerful destroyer of bad and moldy smell. The quassia can be used as an absorbent medium in the shape of a ring or disk; or, to avoid waste of wood, it may be used in the form of a little block. The clay must be pressed into a suitable ring or disk like the ring and disk of the quassia. Either of them must be made to fit the vessel designed for the purpose. In size they must be proportional to the vessel. Both the quassia and the thus-prepared clay constitute a very powerful absorbent, which cannot be excelled, as it absorbs moisture very rapidly and destroys constantly all bad smell accumulating in the vessel from evaporations of the fruit. Besides this, it is exceedingly clean, healthy, cheap, and durable, and does no harm whatever should the fruit come in contact with it.

To characterize the discovery of this absorber, I have to say that no other kind of wood known can be successfully employed for this purpose, for every other kind of wood, when inclosed in an air-tight vessel, will fill the latter with intolerable smell, which will impart a bad taste to the fruit, and thereby spoil it.

The mode of procedure in this process is as follows: First, the air must be rarefied in the vessel or apparatus designed for this purpose by heating it to 140° Fahrenheit, more or less; then the apparatus must be supplied with the absorber, and then the fruit must be inclosed in the still hot vessel, being preferably suspended or supported, so as not to be mashed by its own weight. The vessel is then made air-tight, and as soon as this is done it is removed to a cool place and kept there.

It is advisable that the fruit, just before it is inclosed in the hot vessel, be held for one or two seconds in a moderately-heated oven, in order to expel, as much as possible, the fresh air circulating around it.

With respect to the steps of my process, I would state that rarefaction of the air in the receptacles extracts those vapors which, if allowed to remain in the fruit, conduce to their decay; but the mere extraction of these gaseous matters does not reach the desired result, because such vapors, if allowed to condense upon the surface of the fruit, still cause it to decay. The absorbent, then, it will be seen, coacts with the first step of rarefying the air, in that, while the first step eliminates from the fruit the objectionable vapors and gases, the absorber effectually disposes of the same and prevents recondensation on the fruit.

If any mold should appear on the fruit in the vessel, the process can be repeated as often as necessary by simply taking out and cleaning the fruit and reheating the vessel. After this is done the fruit is inclosed again. This will do no harm to the fruit; but in most cases a mere ventilation of the vessel by removing the plug in its bottom will answer the same purpose.

The process must be applied to the fruit immediately when it is picked. The fruit used must be ripe, but not over-ripe.

The superiority of this process is evidenced by the fact that fresh whole fruit kept by means of the same lasts fully as long when taken out of the apparatus, without decomposing, as it would have lasted originally.

It is a well-known fact that fresh whole fruit, when kept in a refrigerator, will, as soon as taken out, wither and decompose very rapidly. This is not the case with fruit treated by my process. Grapes, which have been kept by me from October till February and May, lasted for weeks after they were taken out of the apparatus without decaying, and strawberries kept by my process for two weeks lasted several days before decomposition set in.

This process affords to housekeepers a very easy method of preserving fresh grapes and other fruit for an unusual length of time without losing their flavor or fresh appearance.

I have also applied this process to oranges and cherries with the same satisfactory result.

In defining my invention more clearly, I would state that I am aware that in preserving meats and vegetables the air has been exhausted from the same and a piece of charcoal inserted to take up offensive smell, and I therefore do not claim, broadly, the conjoint use of a partial vacuum and an absorbent. My degree of exhaustion, however, and peculiar absorbent have, as before stated, a special action and value.

Having thus described my invention, what I claim as new is—

1. In the process of preserving fruits by exhausting the air and absorbing the vapors, the step which consists in exposing said fruits to the action of the principles of quassia contained in a block of quassia wood or other material impregnated with quassia, as and for the purpose described.

2. A deodorizing and absorbent ring, disk, or block for taking up the condensable gases of preserved fruit, made of quassia wood or other material impregnated with quassia, as herein described.

CARL J. RENZ.

Witnesses:
  P. LAHR,
  EDMUND SPENCER.